United States Patent
Broch et al.

(10) Patent No.: US 10,278,069 B2
(45) Date of Patent: Apr. 30, 2019

(54) DEVICE IDENTIFICATION IN SERVICE AUTHORIZATION

(71) Applicant: MOBILE IRON, INC., Mountain View, CA (US)

(72) Inventors: Joshua Glenn Broch, Cupertino, CA (US); Phillip Charles Krasko, Redwood City, CA (US)

(73) Assignee: MOBILE IRON, INC., Mountain View, CA (US)

( * ) Notice: Subject to any disclaimer, the term of this patent is extended or adjusted under 35 U.S.C. 154(b) by 263 days.

(21) Appl. No.: 14/818,151

(22) Filed: Aug. 4, 2015

(65) Prior Publication Data

US 2016/0044511 A1 Feb. 11, 2016

Related U.S. Application Data

(60) Provisional application No. 62/034,672, filed on Aug. 7, 2014.

(51) Int. Cl.
| | |
|---|---|
| *H04W 12/06* | (2009.01) |
| *H04W 12/08* | (2009.01) |
| *H04W 48/16* | (2009.01) |
| *H04L 29/06* | (2006.01) |
| *H04L 9/32* | (2006.01) |

(52) U.S. Cl.
CPC ......... *H04W 12/06* (2013.01); *H04L 63/0807* (2013.01); *H04L 63/0853* (2013.01); *H04L 63/20* (2013.01); *H04W 12/08* (2013.01); *H04W 48/16* (2013.01); *H04L 9/3234* (2013.01)

(58) Field of Classification Search
CPC .............. H04L 9/3234; H04L 63/0807; H04L 63/0853; H04L 63/20; H04W 12/06; H04W 12/08; H04W 48/16
USPC ............................................................ 726/4
See application file for complete search history.

(56) References Cited

U.S. PATENT DOCUMENTS

| | | | |
|---|---|---|---|
| 9,648,141 B2 * | 5/2017 | Reddy | ...................... H04L 67/42 |
| 2004/0117430 A1 * | 6/2004 | Bazot | ...................... G06F 21/31 709/200 |
| 2007/0130463 A1 * | 6/2007 | Law | ........................ G06F 21/34 713/168 |
| 2007/0133763 A1 * | 6/2007 | D'Angelo | .............. G06Q 30/04 379/93.02 |
| 2008/0020738 A1 | 1/2008 | Ho et al. | |
| 2009/0300744 A1 | 12/2009 | Guo et al. | |
| 2011/0030047 A1 * | 2/2011 | Gao | ...................... G06F 21/335 726/9 |
| 2011/0252240 A1 * | 10/2011 | Freedman | ............... H04L 63/02 713/169 |

(Continued)

FOREIGN PATENT DOCUMENTS

| | | |
|---|---|---|
| CN | 1638377 | 7/2005 |
| CN | 102656648 | 9/2012 |

*Primary Examiner* — Harunur Rashid
*Assistant Examiner* — Sakinah White Taylor
(74) *Attorney, Agent, or Firm* — Van Pelt, Yi & James LLP

(57) ABSTRACT

Techniques to authorize access to a service are disclosed. In various embodiments, a token that includes data comprising or otherwise associated with a device identifier of a device on which an application configured to access a service is installed is provided to the application. A service access authorization request that includes the token is received. The token is used to determine device information associated with the service access authorization request.

14 Claims, 8 Drawing Sheets

(56) References Cited

U.S. PATENT DOCUMENTS

| | | | |
|---|---|---|---|
| 2012/0254042 A1* | 10/2012 | Ludemann | G06Q 20/32 |
| | | | 705/78 |
| 2013/0160099 A1 | 6/2013 | Fitzpatrick, III | |
| 2013/0251150 A1* | 9/2013 | Chassagne | G01S 1/042 |
| | | | 380/270 |
| 2013/0252583 A1* | 9/2013 | Brown | H04W 12/06 |
| | | | 455/411 |
| 2014/0007198 A1* | 1/2014 | Durbha | H04L 63/102 |
| | | | 726/4 |
| 2014/0075513 A1 | 3/2014 | Trammel et al. | |
| 2014/0075515 A1* | 3/2014 | McColgan | H04L 67/26 |
| | | | 726/4 |
| 2014/0236846 A1* | 8/2014 | Melika | G06Q 50/184 |
| | | | 705/310 |
| 2014/0281539 A1* | 9/2014 | Faltyn | H04L 63/08 |
| | | | 713/168 |
| 2014/0310792 A1* | 10/2014 | Hyland | H04L 63/0861 |
| | | | 726/8 |

* cited by examiner

DEVICE IDENTIFICATION IN SERVICE AUTHORIZATION

CROSS REFERENCE TO OTHER APPLICATIONS

This application claims priority to U.S. Provisional Patent Application No. 62/034,672 entitled DEVICE IDENTIFICATION IN SINGLE SIGN-ON (SSO) filed Aug. 7, 2014 which is incorporated herein by reference for all purposes.

BACKGROUND OF THE INVENTION

Cloud-based services (e.g., customer relationship management (CRM) services, software as a service (SaaS) providers, etc.) typically have used authorization and/or authentication flows (e.g., OAuth flow, Security Assertion Markup Language (SAML) flow, Basic Authentication flow, and/or any other type of authorization and/or authentication flow) to authenticate the user of a device prior to providing access to the service. In the typical prior approach, the authorization determination was made based solely on user information. Information about the (e.g., mobile) device being used by the user (e.g., device identity, security state, location, etc.) typically has not been available to such services to be used in determining whether to provide access to the service.

BRIEF DESCRIPTION OF THE DRAWINGS

Various embodiments of the invention are disclosed in the following detailed description and the accompanying drawings.

DETAILED DESCRIPTION

Figure 1:
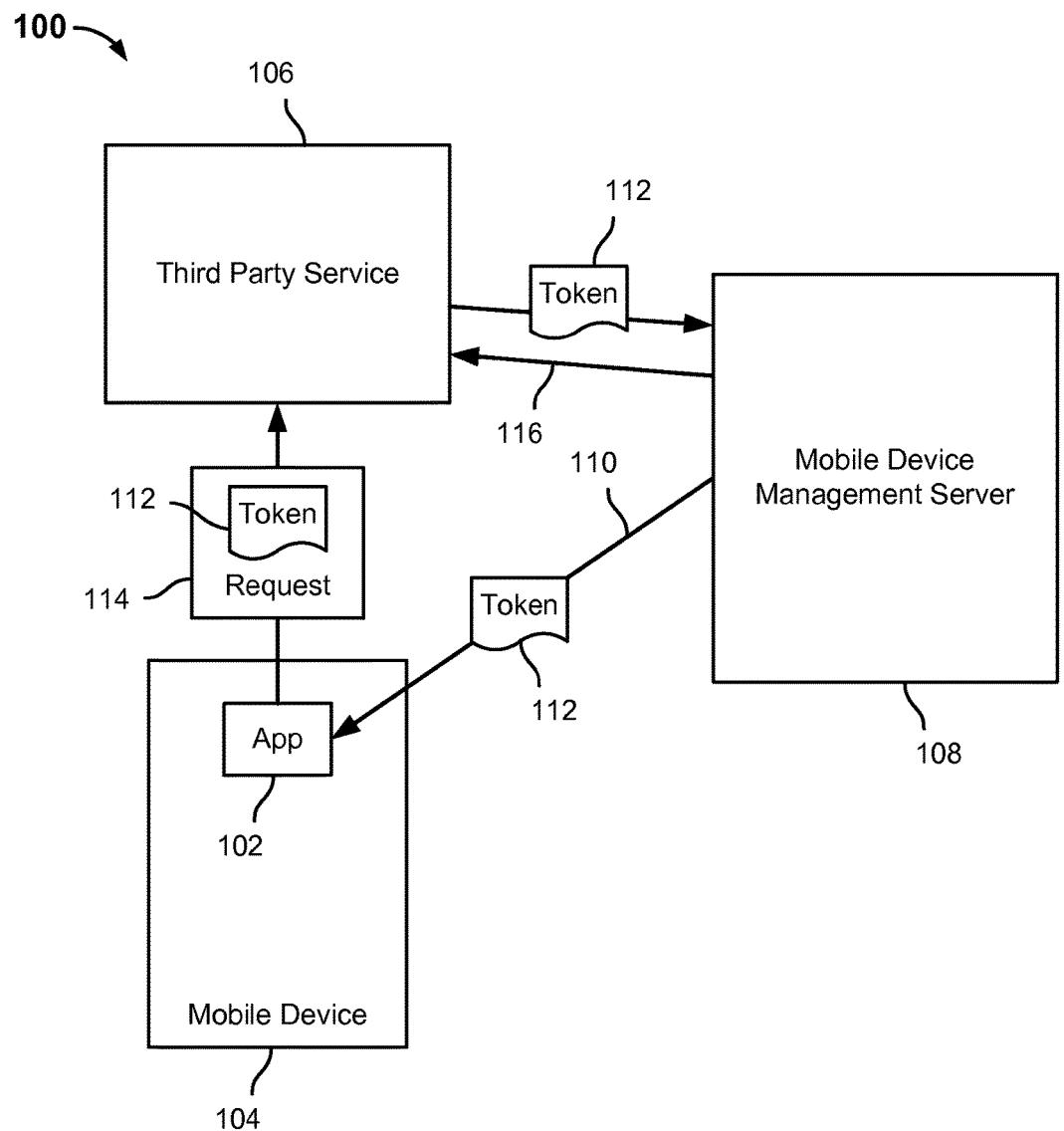
FIG. 1 is a block diagram illustrating an embodiment of a system to provide device identification in connection with service access authorization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to enable service providers to extend authorization flows to not only authenticate the user of a device, but also to authorize the device from which the user is connecting. In various embodiments, an Enterprise Mobility Management (EMM) server (sometimes referred to as a Mobile Device Management or MDM server), or other management server, pushes to an application instance (e.g., mobile app instance) on a device (e.g., a mobile device) a token (e.g., a cryptographic token) to be presented to a third party service (e.g., CRM, SaaS, or other service) in connection with a service access request. In various embodiments, the token may include one or more of a unique device identifier, device state information (e.g., secure, rooted, etc.), and device context information (e.g., location, etc.). In some embodiments, the token is presented to the third party service by the mobile (or other) app in connection with a service access request. The service may present the token to the issuer, e.g., the MDM or other management server, to determine whether the device is authorized to be used to access the service. In some embodiments, the MDM or other management server may apply one or more policies and return to the third party service a response indicated whether the requested service should or should not be provided. In some embodiments, the MDM or other management server returns information that is used by the third party service to determine whether the device is authorized.

FIG. 1 is a block diagram illustrating an embodiment of a system to provide device identification in connection with service access authorization. In the example shown, the system 100 includes a mobile app 102 installed on a mobile device 104, such as a smart phone or tablet device. The mobile app 102 is configured in various embodiments to provide access to a third party service 106. Examples of such mobile apps and associated services include, without limitation, customer relationship management (CRM) apps such as SAP™, Salesforce.com™, and others. In the example shown, the mobile device 104 is under management by a mobile device management (MDM) server 108. In various embodiments, a "third party service" may be any service that is not provided directly by or through an MDM server or other/related node configured to participate in management of a device, such as MDM server 108 in the example shown.

MDM server 108, sometimes referred to as an "enterprise mobility management" (EMM) server, provides management for mobile devices associated with an enterprise, such as mobile device 104. Examples of such management may include, in various embodiments, one or more of control over which apps are required and/or precluded from being installed on a device used to access enterprise data; functionality to detect and take responsive action based on the detected security state of a mobile device (e.g., root access attained or device "jailbroken"); remote wipe of the entire device; selective remote wipe of enterprise data (e.g., while not wiping personal data of the user/employee); controlled access to backend enterprise services, e.g., via a security proxy (not shown in FIG. 1); monitoring of device state; reporting of device context information, such as location; provisioning of enterprise apps, such as mobile app 102; etc.

In the example shown, MDM server 108 provides to mobile app 102, via a push or other communication 110, a token 112 to be used to access third party service 106. In various embodiments, token 112 includes a device identifier associated uniquely with mobile device 104. In various embodiments, token 112 may include, in encrypted form, one or more of the following: device ID (e.g., identifier by which the MDM server 108 identifies the mobile device 104); a bundle identifier or other identifier associated uniquely with the instance of mobile app 102 installed on mobile device 104; mobile device context data (e.g., location, country, roaming status, etc.); and mobile device security state information (e.g., compromised, secure, etc.). In various embodiments, token 112 may include, for example, device information, user information, app information (e.g., bundle ID and/or other information), expiration information, and/or other information. In certain cases, the cryptographic token may be updated and/or revalidated by the issuer over time.

In various embodiments, a "token" may be any set of data. In some embodiments, token 112 may be a cryptographic token, i.e., a set of encrypted data. In various embodiments, the form and/or format of the token 112 and/or the manner in which it is provided to the mobile app 102 may vary. In some embodiments, the form/format of the token 112 may depend on the method by which mobile app 102 is configured to obtain authorization to access the third party service 106, e.g., OAuth flow, SAML flow, Basic Authentication, etc. In various embodiments, the app/device will provide the token back to the authentication server based on how the app is configured to authenticate.

In some embodiments, a token 112 may include a cryptographic token that may, for example, only be validated by an issuer (e.g., an entity associated with the mobile device management platform (e.g., MDM server 108)).

According to various embodiments, a mobile device management (MDM) platform (e.g., MDM server 108) may provision 110 a mobile application such as mobile application 102 with an authorization token 112 in a manner supported by the MDM server 108 and the mobile device 104 (e.g., an operating system of mobile device 104). For example, the MDM server 108 may provide the application 102 the token 112 via a managed application functionality of the device (e.g., the Managed App Configuration in iOS), using a uniform resource location (URL) scheme, via a pasteboard (e.g., a named pasteboard), using an Android intents-associated approach, using Android App Restrictions, and/or using other approaches, depending on the type of platform (i.e., mobile device 104) and its capabilities.

According to some embodiments, a Simple Certificate Enrollment Protocol (SCEP) profile may be provisioned to the mobile app 102. The mobile app 102 may obtain a specific identity (e.g., based on the SCEP profile), and/or this identity may be used for authentication, authorization, and/or other purposes.

Referring further to FIG. 1, in the example shown mobile app 102 is configured to include token 112 in a request 114 to access third party service 106. Third party service 106 presents the token 112 via an authorization query sent to the MDM server 108 that issued the token. MDM server 108 performs processing based on the token 112 and provides to the third party service 106 an authorization response 116. For example, in some embodiments, the third party service 106 may validate a security state, location, or other information associated with mobile device 104 by querying the MDM server 108.

In some embodiments, the third party service 106 may connect to the MDM server 108 to determine (e.g., find) security state and/or other information associated with the mobile device 104. In some embodiments, the token 112 may be opaque to (i.e., unreadable by) the third party service 106 and may be passed through to the MDM server 108 as an opaque, encrypted blob. The MDM server 108 may decrypt the token 112 and use the device identifier and/or other information included in the token 112 to provide a response to the third party service 106. For example, the response may be a simple indication that access to the third party service 106 by mobile app 102 on this particular mobile device 104 is "authorized" or "not authorized". In some embodiments, information extracted from the token 112 may be provided back to the third party service 106, e.g., to enable policies to be applied by the third party service, such as policies based on security state and/or security compliance of the device 104; user identity associated with the device 104; device information of the device 104 (e.g., location); and/or other types of responses.

In various embodiments techniques disclosed herein are described as being used in the context of an OAuth flow; however, similar approaches may be used with other authorization and/or authentication flows including, for example, a SAML flow, Basic Authentication, etc. For example, a Basic Authentication approach may be extended to include the token as an additional hypertext transfer protocol (HTTP) header. In various embodiments, any authentication/authorization flow could include a call out to the MDM server for additional device state—as long as, for example, the device can present its device token in connection with accessing the third party service.

In various embodiments, a call to the mobile device management authorization server may be a representational state transfer (REST) call. In some embodiments, the third party service may authorize the device via a formalized OAuth extension and/or other interface. Other approaches may of course be used.

In some embodiments, the app may be configured to present the token to the MDM server, instead of to the third party service. For example, upon being launched and/or otherwise receiving an indication to access the third party service, the app may be configured to present the token to the MDM server to perform a compliance check. The MDM server may verify the device is in a compliant state (e.g., by applying one or more policies) and/or perform other processing, and return to the app an indication whether to proceed to authenticate to the third party service. If the compliance check result indicates the device was found to be compliant and/or otherwise currently authorized to be used to access the service, the app may be configured to proceed with an attempt to authenticate to the third party service. If the compliance check result was negative, in some embodiments the app would halt the authentication flow and would not attempt to authenticate itself to the third party service, since the pre-authentication check with the MDM server failed.

Figure 2:
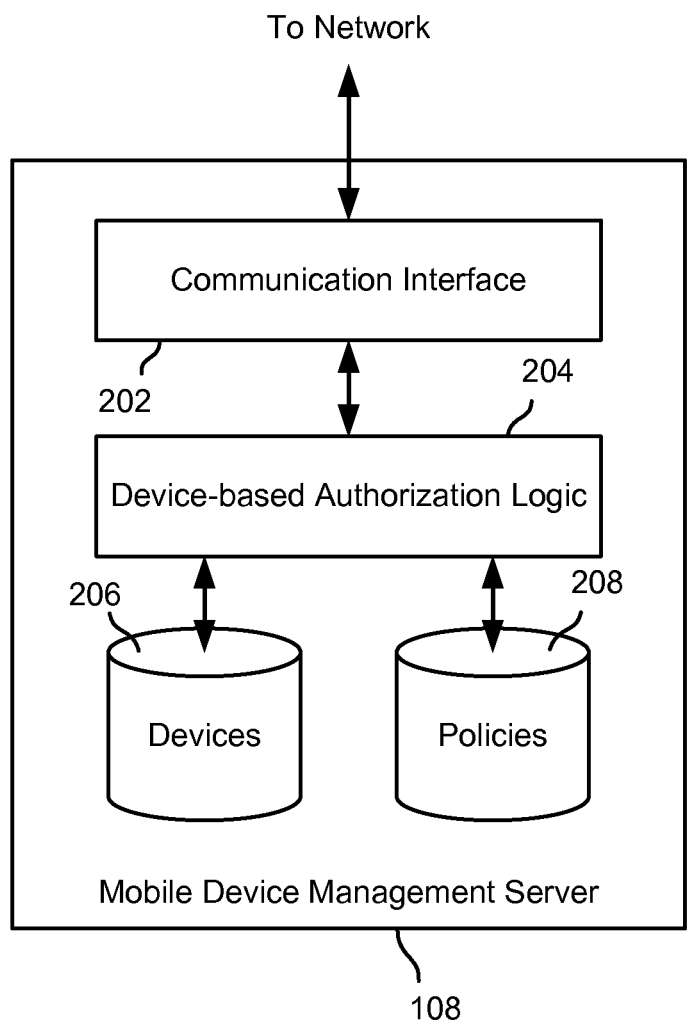
FIG. 2 is a block diagram illustrating an embodiment of a mobile device management (MDM) server system.

FIG. 2 is a block diagram illustrating an embodiment of a mobile device management (MDM) server system. In the example shown, MDM server 108 of FIG. 1 is shown to include a communication interface 202, which provides access to mobile devices, such as mobile device 104, and/or third party services, such as service 106, via one or more networks (e.g., mobile telecommunications network, the Internet, etc.). The MDM server 108 further includes device identity-based authorization logic 204. In various embodiments, device identity-based authorization logic 204 includes software code operable to perform one or more of the following: generate and provide (provision) to mobile app instances, such as mobile app 102 of FIG. 1, a cryptographic token to be used to access a third party service, e.g., a token that includes a device identifier associated uniquely with a device, such as mobile device 104, on which the mobile app 102 instance is installed; receive from a third party service and decrypt a token provided to the third party service in connection with a request to access the service; extract device and/or other information from a decrypted token 112; identify, based on information extracted from a received and decrypted token, one or more policies applicable to the device with which the token is associated; apply one or more policies to information obtained and/or derived from information included in a received token, e.g., to make an access authorization determination with respect to the third party service; and generated and provide a responsive communication to the third party service, e.g., a response including one or both of information extracted and/or derived from information comprising the token and an indication of a result of an authorization determination made at the MDM server 108 (e.g., a binary "authorized" or "not authorized" result; or a result indicating a reason the device is not authorized).

In the example shown in FIG. 2, the device identity-based authorization logic 204 stores device information, such as device identifiers, configuration, security or other state, context (e.g., location), and/or other device information in a device database 206. Device identifiers and/or other information extracted and/or derived from data comprising a received token may be used to identify and apply to a service access request in connection with which the token has been received one or more applicable policies stored in a policy database 208. For example, a policy stored in database 208 may indicate that a device with which the access request is associated is authorized to access the service only when the device is in certain locations, and/or at certain times (e.g., normal workday) and/or on certain days of the week (e.g., weekdays). In some embodiments, device context data (e.g., location) and/or access request context data (e.g., day/time) may be used to determine whether access is to be provided.

Figure 3:
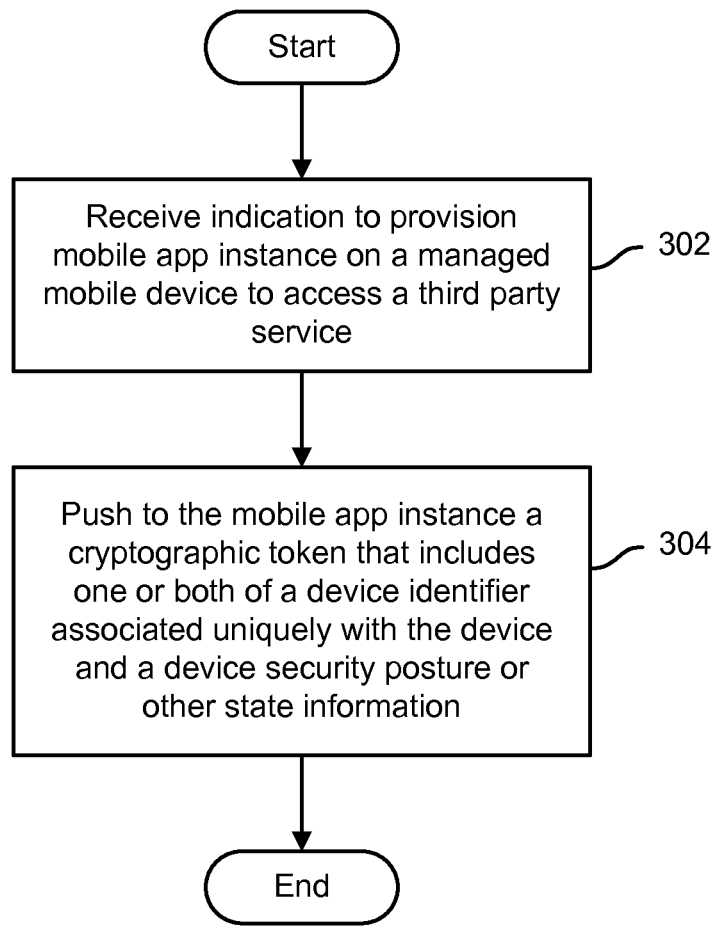
FIG. 3 is a flow chart illustrating an embodiment of a process to provision a mobile app to access a third party service.

FIG. 3 is a flow chart illustrating an embodiment of a process to provision a mobile app to access a third party service. In various embodiments, the process of FIG. 3 may be implemented by a mobile device management server, such as MDM server 108 of FIGS. 1 and 2. In the example shown, an indication is received (302) to provision a mobile app instance (e.g., mobile app 102 of FIG. 1) on a managed mobile device (e.g., mobile device 104 of FIG. 1) to access a third party service, such as third party service 106 of FIG. 1. For example, an indication may be received, such as in connection with registration and provisioning of mobile device 104, that the mobile app (e.g., mobile app 102) has been installed on the managed device. A policy or rule may indicate that installation of the mobile app 102 requires that the mobile app 102 be provisioned and/or configured to access the third party service. In response to the indication (302), a cryptographic token (e.g., token 112 of FIG. 1) is pushed to the mobile app instance (304). In the example shown, the token may include one or both of a device identifier associated with the device on which the mobile app instance is installed and a device security posture (e.g., state) or other device state (or context) information (e.g., location).

Figure 4:
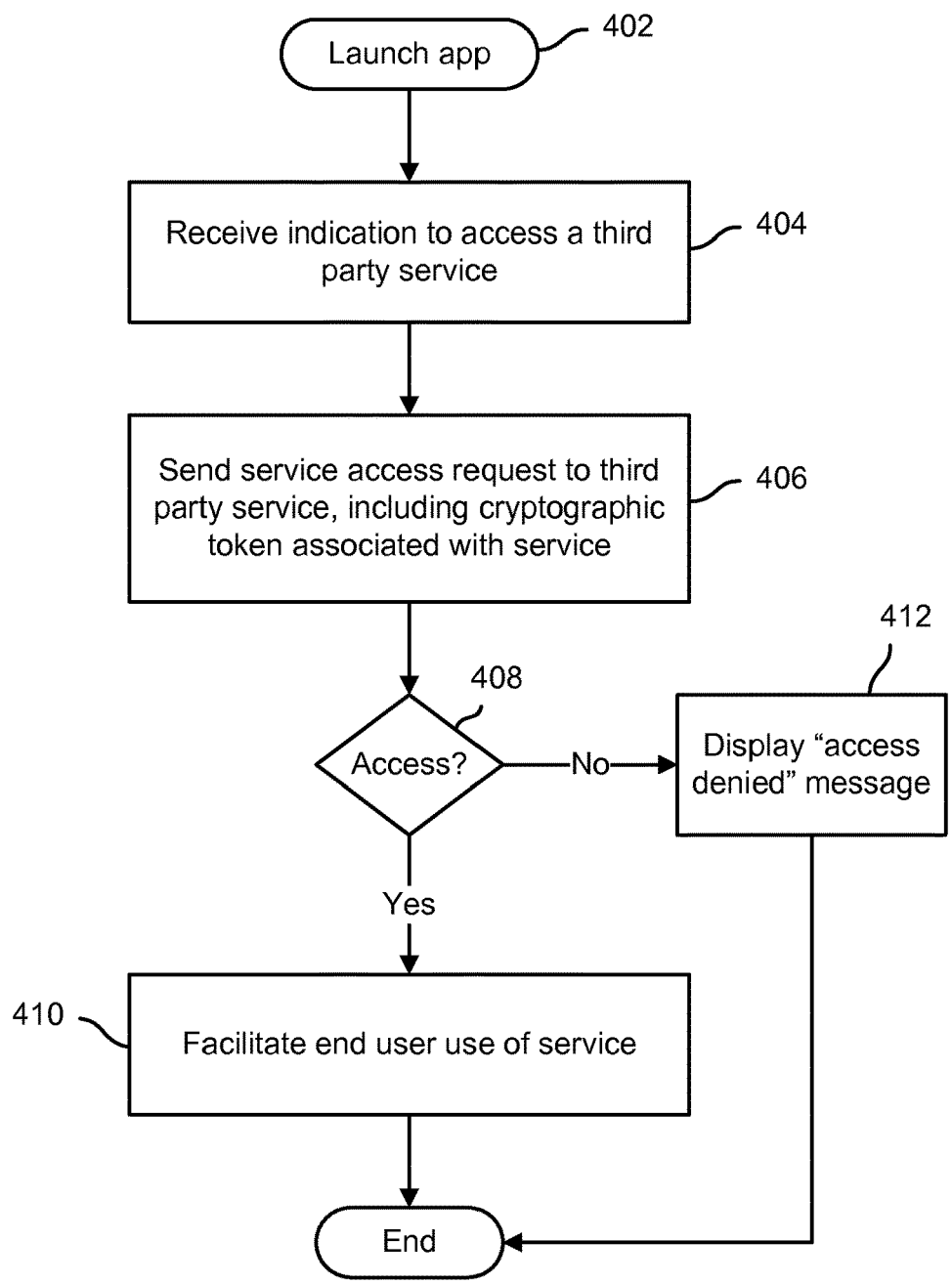
FIG. 4 is a flow chart illustrating an embodiment of a process to access a service.

FIG. 4 is a flow chart illustrating an embodiment of a process to access a service. In various embodiments, the process of FIG. 4 may be implemented by a mobile app, such as mobile app 102 of FIG. 1. In the example shown, the mobile app is launched (402) and an indication (e.g., app user input) is received to access a third party service (404). For example, a button or other control to access the service may have been selected by the user; or a folder, document, or other icon or graphical representation of service-related content may have been selected; or an external application may have triggered launch of the app, e.g., via a hyperlink to launch the app in a webpage. In response to the indication (404), a service access request is sent (406) to the third party service, including a cryptographic token that the mobile app is configured to include in the request. For example, in various embodiments, the cryptographic token may have been pushed or otherwise provided to the app, e.g., as described above. If a response indicating that access to the service has been authorized is received (408), end user use of the third party service is facilitated (410). For example, the mobile app may provide a user interface to enable a user of the mobile device on which the mobile app is installed to access the service. If a response indicating that access to the service has been denied is received (408), an "access denied" or other error and/or informational message is displayed (412) at the mobile device. For example, a message to contact a mobile device management administrator may be displayed.

Figure 5:
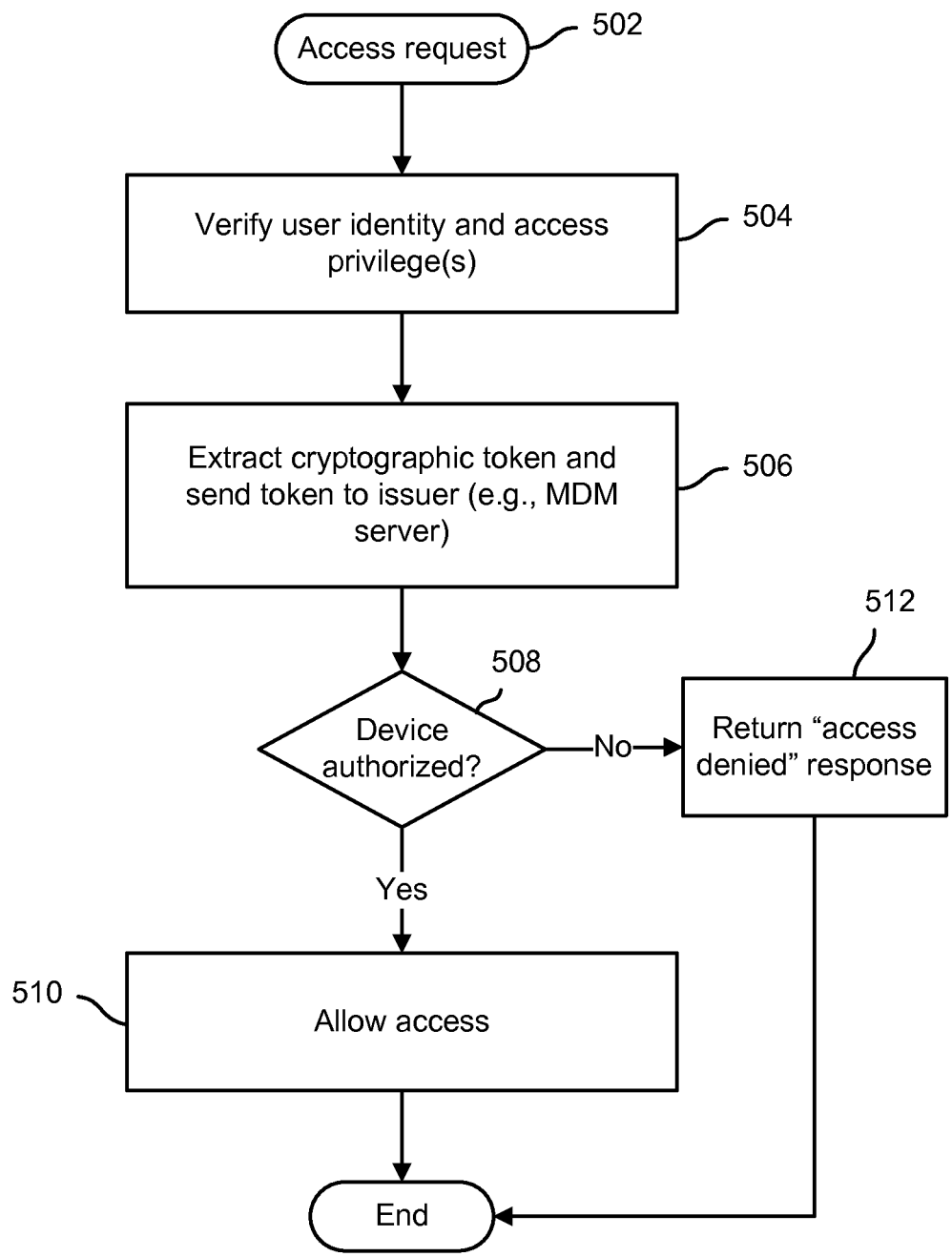
FIG. 5 is a flow chart illustrating an embodiment of a process to authorize access to a service.

FIG. 5 is a flow chart illustrating an embodiment of a process to authorize access to a service. In various embodiments, the process of FIG. 5 may be performed by a third party service, such as third party service 106 of FIG. 5. In the example shown, an access request is received (502). User identity and/or credential information included in and/or associated with the request may (optionally) be used to verify that the user is recognized and/or authorized to access the service (504). A cryptographic token included in and/or otherwise associated with the access request is extracted (e.g., from the service access request) and sent to an MDM server (or other issuer) that issued the token (506). If a response is received that indicates that the device is authorized to be used to access the service (508), then access to the service is provided (510). If the response indicates the device is not authorized to be used to access the service (508), then access to the service is denied (512). In some embodiments, the response from the MDM server (or other issuer) may indicate a reason to deny access, e.g., that the device has been compromised, that the device is not allowed to be used to access the service from a current location of the device, etc. In various embodiments, access may be denied (512) at least in part by sending to the mobile device from which the service access request was received a response indicating that access has been denied. In some embodiments, the response may include a reason based on which access was denied.

Figure 6:
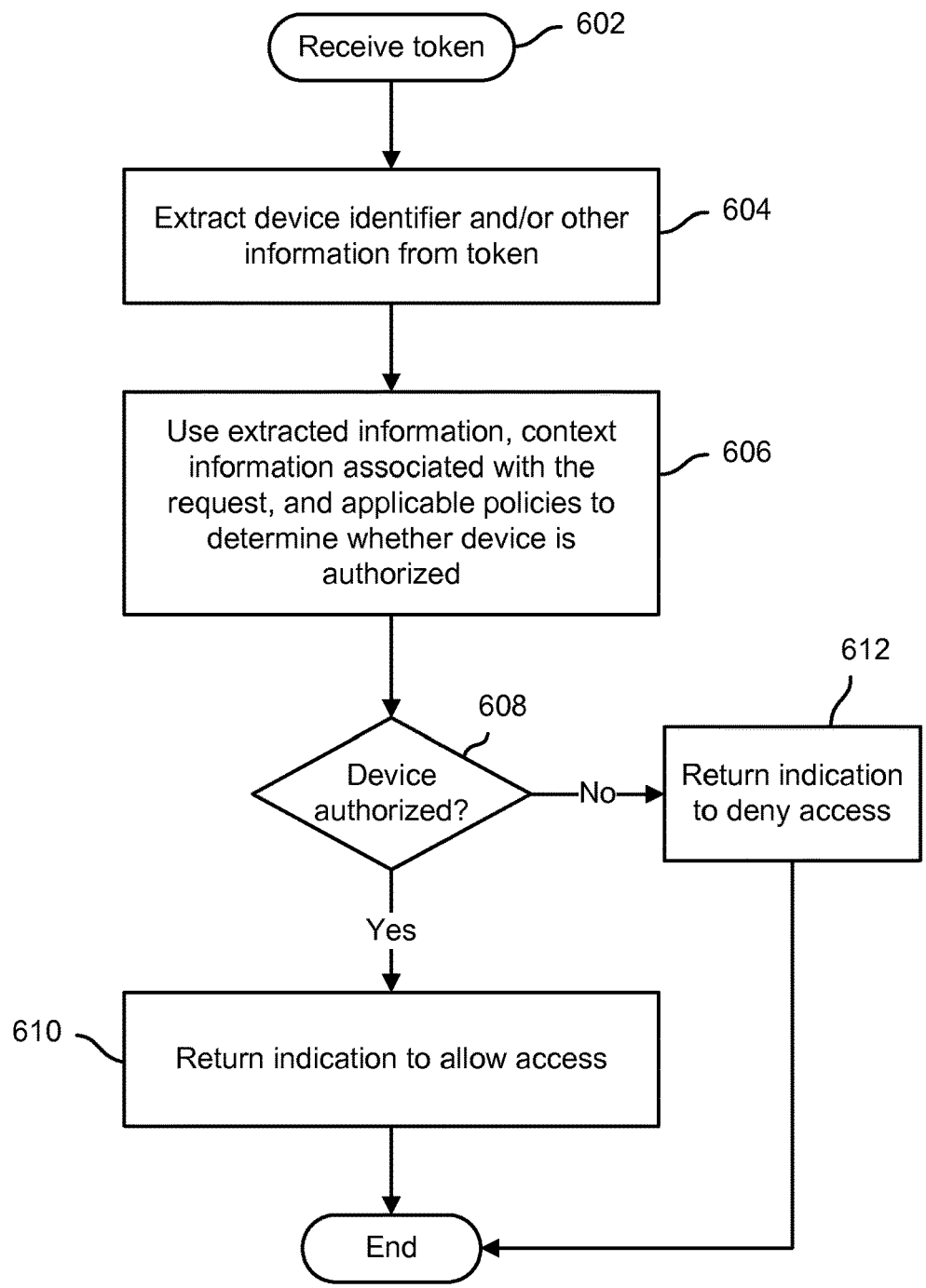
FIG. 6 is a flow chart illustrating an embodiment of a process to determine whether to authorize access to a service.

FIG. 6 is a flow chart illustrating an embodiment of a process to determine whether to authorize access to a service. In various embodiments, the process of FIG. 6 may be performed by an MDM server, such as MDM server 108 of FIGS. 1 and 2, and/or another issuer of a cryptographic token that embodies device information. In the example shown, a cryptographic token is received (602), e.g., from a third party service, in connection with a request to access the service. For example, the token may be received from a third party service as part of an access authorization flow associated with a request from a mobile app instance (e.g., mobile app 102) running on a mobile device (e.g., mobile device 104) to access the service. A device identifier and/or other information (e.g., app bundle identifier) is extracted from the token (604). The extracted information is used, in this example (optionally) along with context information, such as the day/time of the request, to determine based on applicable policies whether the device is authorized to be used to access the service (606). If access is determined to be authorized (608), a response is returned to the service indicating that access should be allowed (610). If access is determined to not be authorized (608), a response is returned to the service indicating that access should be denied (612).

Figure 7:
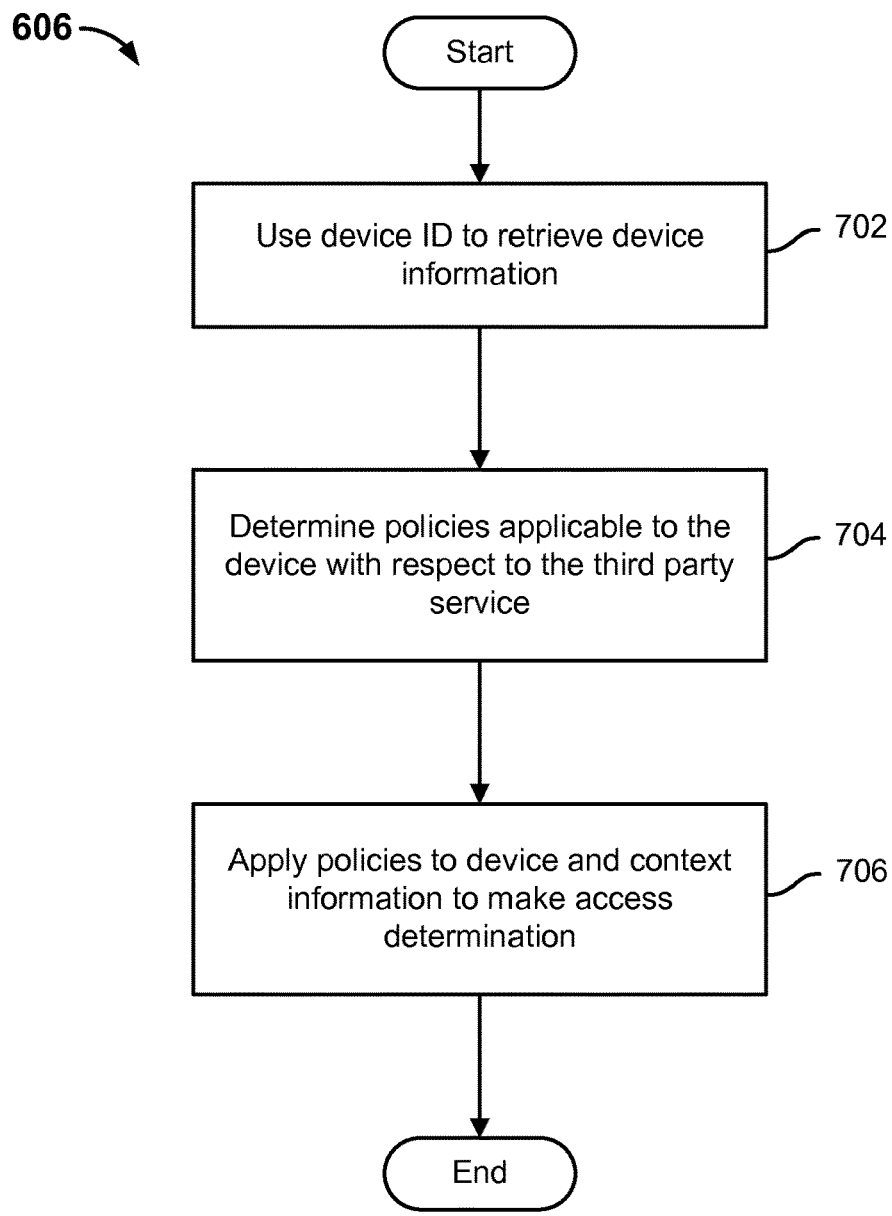
FIG. 7 is a flow chart illustrating an embodiment of a process to use device information to determine whether to authorize access to a service.

FIG. 7 is a flow chart illustrating an embodiment of a process to use device information to determine whether to authorize access to a service. In various embodiments, step 606 of the process of FIG. 6 may include the process of FIG. 7. In the example shown, a device identifier extracted from the received cryptographic token is used to retrieve current device information (702). Examples of device information include security state information, current and/or last reported location, last check-in time, etc. Policies applicable to the device with respect to the request to access the third party service are retrieved (704). For example, a policy associated with the device (e.g., the device identifier), a user with whom the device is associated, a group with which the device and/or user is/are associated, etc., may be retrieved. The policies are applied to the device and associated context information (e.g., day of week, time of day, device location, enterprise-wide and/or service-wide security threat level, etc.) to determine whether access to the service should be authorized (706).

Figure 8:
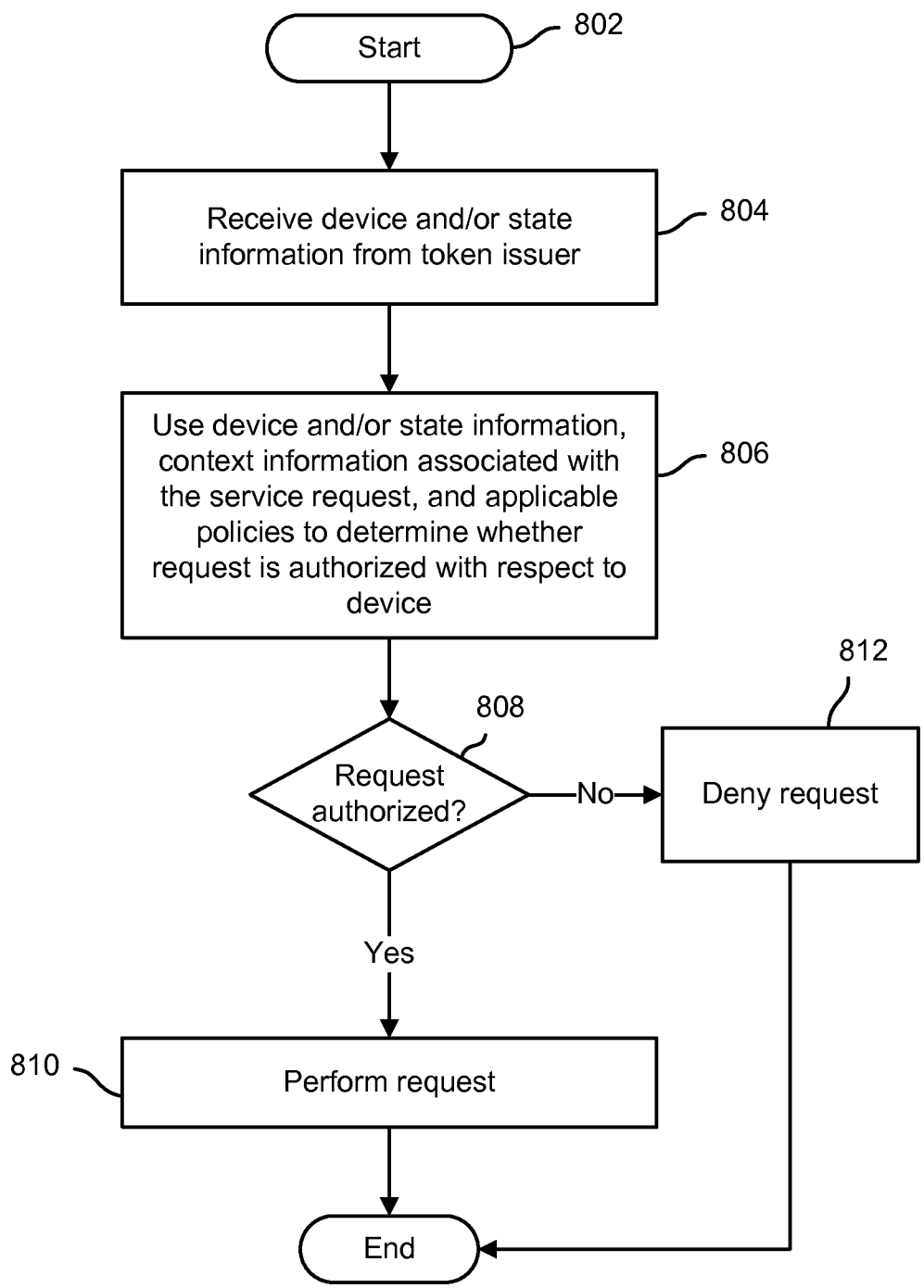
FIG. 8 is a flow chart illustrating an embodiment of a process to use device information to determine whether to authorize access to a service.

FIG. 8 is a flow chart illustrating an embodiment of a process to use device information to determine whether to authorize access to a service. In some embodiments, a third party service, such as third party service 106 in the example shown in FIG. 1, may be configured to apply one or more policies or rules to make access authorization determinations based on device information received from an issuer of a cryptographic token provided by the issuer to a mobile app instance with which a service access request is associated. In the example shown, in response to a query from the third party service to an issuer of the cryptographic token, device and/or state information is received from the issuer (802, 804). For example, device identity, device group membership, device security state, device location, etc. data may be received. The received device/state information is used, by the third party service in this example, along with context information associated with the request (e.g., day of the week, time of day, specific service and/or type of access requested, etc.), to determine based on applicable policies whether the service access request is authorized (currently) with respect to the device (806). If the request is determined, at the third party service, to be authorized (808), access to the requested service is provided (810). If the request is determined, at the third party service, to not be authorized (808), the requested is denied (810).

Applying techniques disclosed herein, access to a service may be controlled based on device information that would not normally be available to the service in a sufficiently reliable/secure way to enable service access authorization determinations to be made. In various embodiments, granular control of access may be provided, e.g., by defining policies, rules, and the like to govern service access authorization determinations based on device and/or context information provided and/or obtained as disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of authorizing access to a third party service, comprising:

providing, from a mobile device management server to an instance of an application configured to access the third party service a token, wherein the token includes data comprising or otherwise associated with a device identifier of a device on which the instance of the application is installed, wherein the token includes device state information, wherein the device state information indicates a security state of the device, wherein the device on which the instance of the application is installed is configured to send to the third party service a service access authorization request that includes the token;

receiving, at the mobile device management server from the third party service, an authorization query that includes the token that was included in the service access authorization request, wherein the third party service is configured to send the authorization query in response to the service access authorization request;

using, by the mobile device management server, the received token that was included in the service access authorization request to determine device information associated with the service access authorization request; and providing, from the mobile device management server to the third party service, a notification that is based on the determined device information, wherein the service is configured to provide service access to the device based on the notification.

2. The method of claim 1, further comprising generating the token.

3. The method of claim 1, wherein the token is pushed to the instance of the application.

4. The method of claim 1, wherein the token includes an identifier associated with the instance of the application.

5. The method of claim 1, wherein the token comprises a cryptographic token and using the cryptographic token to determine device information associated with the service access authorization request includes decrypting the token and extracting the device identifier.

6. The method of claim 5, wherein using the cryptographic token to determine device information associated with the service access authorization request includes determining based at least in part on the device identifier a policy associated with the request.

7. The method of claim 1, further comprising using the device information associated with the service access authorization request to determine whether to authorize the service access request.

8. The method of claim 7, wherein the notification indicates whether the requested access to the third party service is authorized.

9. The method of claim 1, further comprising including in a response to the service access authorization request at least a subset of the determined device information.

10. The method of claim 9, wherein the third party service is configured to use the device information to make a service access authorization determination.

11. A system to authorize access to a third party service, comprising:
  a communication interface; and
  a processor coupled to the communication interface and configured to:
    provide to an instance of an application configured to access the third party service a token, wherein the token includes data comprising or otherwise associated with a device identifier of a device on which the instance of the application is installed, wherein the token includes device state information, wherein the device state information indicates a security state of the device, wherein the device on which the instance of the application is installed is configured to send to the third party service a service access authorization request that includes the token;
    receive via the communication interface from the third party service an authorization query that includes the token that was included in the service access authorization request, wherein the third party service is configured to send the authorization query in response to the service access authorization request;
    use the received token that was included in the service access authorization request to determine device information associated with the service access authorization request; and
    provide to the third party service a notification that is based on the determined device information, wherein the service is configured to provide service access to the device based on the notification.

12. The system of claim 11, wherein the processor is further configured to generate the token.

13. The system of claim 11, wherein the processor is further configured to use the device information associated with the service access authorization request to determine whether to authorize the service access request.

14. A computer program product to authorize access to a third party service, the computer program product being embodied in a non-transitory computer readable medium and comprising computer instructions for:
  providing to an instance of an application configured to access the third party service a token, wherein the token includes data comprising or otherwise associated with a device identifier of a device on which the instance of the application is installed, wherein the token includes device state information, wherein the device state information indicates a security state of the device, wherein the device on which the instance of the application is installed is configured to send to the third party service a service access authorization request that includes the token;
  receiving from the third party service an authorization query that includes the token that was included in the service access authorization request, wherein the third party service is configured to send the authorization query in response to the service access authorization request;
  using the received token that was included in the service access authorization request to determine device information associated with the service access authorization request; and
  providing to the third party service a notification that is based on the determined device information, wherein the service is configured to provide service access to the device based on the notification.

* * * * *